(12) United States Patent
Chen et al.

(10) Patent No.: US 12,190,109 B2
(45) Date of Patent: Jan. 7, 2025

(54) STORING COMPLEX DATA IN WARP GPRS (71) Applicant: Huawei Technologies Co., Ltd., Shenzhen (CN)

(72) Inventors: Lin Chen, San Diego, CA (US); Zhou Hong, Cupertino, CA (US); Yufei Zhang, San Jose, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/486,434

(22) Filed: Sep. 27, 2021

(65) Prior Publication Data
US 2022/0012053 A1 Jan. 13, 2022

Related U.S. Application Data

(63) Continuation of application No. PCT/CN2019/090202, filed on Jun. 5, 2019.

(60) Provisional application No. 62/823,296, filed on Mar. 25, 2019.

(51) Int. Cl.
*G06F 9/38* (2018.01)
*G06F 9/30* (2018.01)

(52) U.S. Cl.
CPC ........ *G06F 9/3001* (2013.01); *G06F 9/30098* (2013.01); *G06F 9/3851* (2013.01); *G06F 9/3887* (2013.01); *G06F 9/3888* (2023.08)

(58) Field of Classification Search
None
See application file for complete search history.

(56) References Cited

U.S. PATENT DOCUMENTS

| | | | | |
|---|---|---|---|---|
| 5,327,566 A | * | 7/1994 | Forsyth | G06F 9/30123 711/147 |
| 8,644,643 B2 | * | 2/2014 | Jiao | G06F 17/153 382/274 |
| 9,799,094 B1 | * | 10/2017 | Chen | G06T 9/00 |
| 12,039,330 B1 | * | 7/2024 | Meyer | G06F 9/3001 |
| 2001/0049781 A1 | * | 12/2001 | Miyake | G06F 9/3013 712/228 |
| 2004/0019768 A1 | * | 1/2004 | Ross | G06F 9/383 712/216 |

(Continued)

FOREIGN PATENT DOCUMENTS

| | | |
|---|---|---|
| CN | 107563953 A | 1/2018 |
| CN | 108133263 A | 6/2018 |

(Continued)

OTHER PUBLICATIONS

Intel Stratix 10 General Purpose I/O User Guide, 2019, 03/04, Intel (Year: 2019).*

(Continued)

*Primary Examiner* — Hyun Nam
(74) *Attorney, Agent, or Firm* — Slater Matsil, LLP (57) ABSTRACT

A method of storing data in general purpose registers (GPRs) includes packing a tile of data items into GPRs, where the tile includes multiple channels. The tile of data items is read from memory. At least two channels of the data are stored in a first GPR, and at least two additional channels are stored in a second GPR. Auxiliary data is loaded into a third GPR. The auxiliary data and the tile data can be used together for performing convolution operations.

22 Claims, 8 Drawing Sheets (56) References Cited

U.S. PATENT DOCUMENTS

| | | | | |
|---|---|---|---|---|
| 2004/0054873 A1* | 3/2004 | Morris | ............... | G06F 9/30032 |
| | | | | 712/E9.034 |
| 2008/0117221 A1* | 5/2008 | Hutchins | ................ | G06T 15/40 |
| | | | | 345/506 |
| 2009/0300634 A1* | 12/2009 | Ramsey | ............... | G06F 9/5011 |
| | | | | 718/104 |
| 2011/0016338 A1* | 1/2011 | Williamson | ......... | G06F 9/3891 |
| | | | | 712/228 |
| 2020/0210188 A1* | 7/2020 | Ould-Ahmed-Vall | ...................... | |
| | | | | G06F 9/3802 |
| 2021/0089316 A1* | 3/2021 | Rash | ...................... | G06N 3/045 |
| 2021/0264560 A1* | 8/2021 | Hong | .................. | G06T 15/005 |
| 2022/0012053 A1* | 1/2022 | Chen | ..................... | G06F 9/3851 |

FOREIGN PATENT DOCUMENTS

| | | |
|---|---|---|
| CN | 108897522 A | 11/2018 |
| CN | 109388777 A | 2/2019 |
| WO | 2014025765 A2 | 2/2014 |

OTHER PUBLICATIONS

Qadeer, W., et al., "Convolution Engine: Balancing Efficiency & Flexibility in Specialized Computing", ISCA'13: Proceedings of the 40th Annual International Symposium on Computer Architecture, Jun. 23-27, 2013, 12 Pages.

* cited by examiner

STORING COMPLEX DATA IN WARP GPRS

CROSS-REFERENCE TO RELATED APPLICATIONS

This application is a continuation of International Application No. PCT/CN2019/090202 filed on Jun. 5, 2019, and entitled "Storing Complex Data in Warp GPRS," which claims priority to U.S. Provisional Patent Application No. 62/823,296, filed on Mar. 25, 2019, and entitled "Storing Complex Data in Warp GPRS," which applications are incorporated herein by reference as if reproduced in their entireties.

TECHNICAL FIELD

This disclosure relates generally to single instruction multiple data (SIMD) processing systems, and more specifically to storing complex data in warp GPRs.

BACKGROUND

Single instruction multiple data (SIMD) processing systems can concurrently apply the same instruction to multiple data items, referred to as threads. These threads are often organized into groups of data, called warps based on the capabilities of the processing system. Thus, for example, in the case of a SIMD32, which can perform the same operation on 32 threads concurrently, data is generally organized into warps containing 32 threads.

The parallel nature of SIMD systems can be useful when performing certain mathematical operations, including performing convolution operations. When performing convolution operations, the inputs and outputs to an arithmetic logic unit (ALU) are usually stored in general purpose registers (GPRs). The input data for a convolution is loaded into GPRs from memory, and the output data from a convolution is stored in GPRs.

Usually, the input data for a convolution can be 8b, 16b, or 32b, per channel, per pixel, while the output data from a convolution is often 16b or 32b per pixel. References to 8b, 16b, 32b, 64b, etc. are references to 8 bits, 16 bits, 32 bits, 64 bits, etc. In conventional systems, 8b input data is converted into 16b data and stored in 16b GPRs; 16b input data is stored in 16b GPRs; and 32b input data is stored in 32b GPRs.

Figure 1:
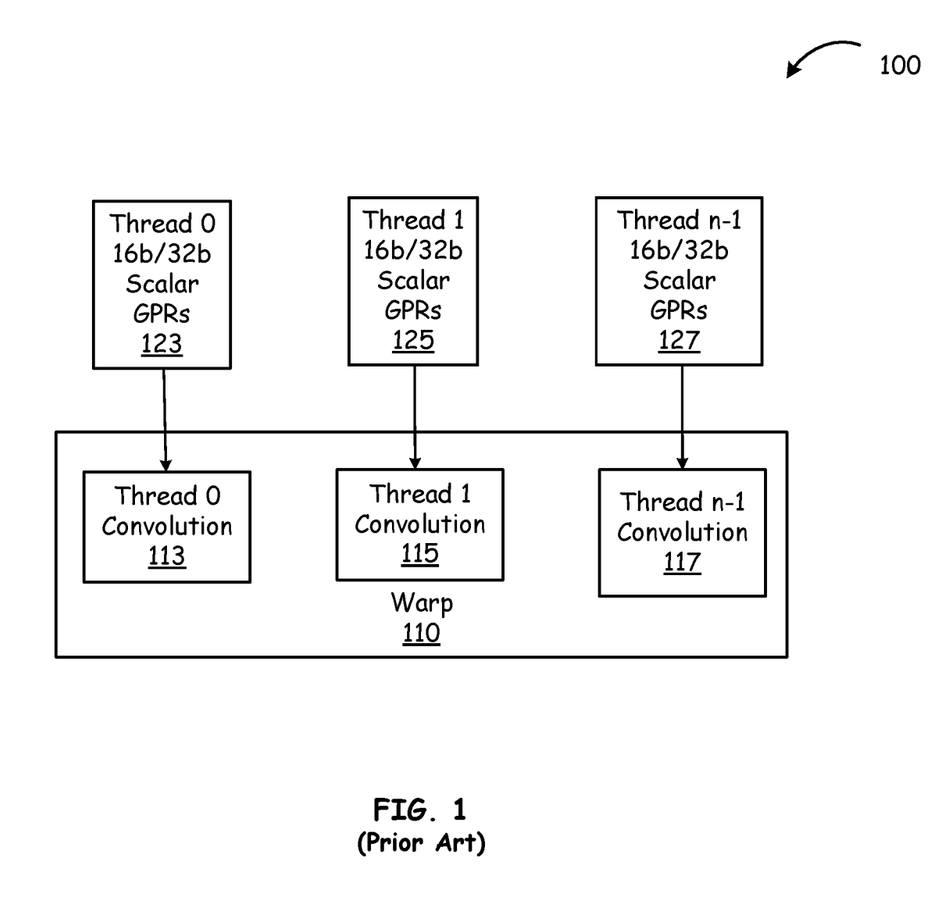
FIG. 1 is a block diagram illustrating a prior art arrangement of per-thread address registers used to reference a location a general purpose register (GPR)

Prior art FIG. 1 illustrates this prior art process 100, in which data for Thread 0 through Thread n−1 of a warp 110 are stored in 16b or 32b data in scalar GPRs 123, 125, or 127. Each thread is then used in convolution operations 113, 115, and 117. The outputs of the convolution operations are also stored in 16b or 32b GPRs.

One problem with conventional systems and techniques for storing and reading data to/from GPRs to be used in convolution operations is that access speeds tend to be slower than is required for fast convolutional operations.

SUMMARY

Various embodiments described herein organize data stored in GPRs in a manner that is more easily used to perform fast convolutions. That is to say, new ways of organizing input and output data in GPRs can provide improved computational efficiency when compared to conventional GPR data organization techniques.

As used herein, the term "convolution" refers to a mathematical operation that is fundamental to many common image processing operations. In general, convolution provides a way of multiplying together two arrays of numbers to produce a third array of numbers. For example, the convolution operation can be used in image processing to implement operators whose output pixel values are linear combinations of certain input pixel values.

The inputs to a convolution are often two matrices, each matrix having multiple elements. In image processing, one matrix is referred to as a kernel, or mask, while the other matrix is referred to as the image. Convolving the two matrices can be used for blurring or sharpening the image, embossing the image, edge detection of the image, or the like. At a basic level, convolution can be considered a filtering technique.

In various implementations, pixels can be mapped to threads of a warp in linear or tiled fashions. For example, a SIMD32 warp can process 32 pixels in a 1×32 or 4×8 pixel block simultaneously. These blocks of pixels are referred to herein as a "tile." Performing an accurate convolution on a tile of pixels requires the convolution process to have information about pixels adjacent to, but not necessarily part of, the tile. These adjacent, or surrounding, pixels are referred to as auxiliary pixels.

In various embodiments, pixels in a tile are loaded into 32b GPRs, while auxiliary pixels are loaded into 64b GPRs. In at least one implementation, the tiles and the auxiliary pixels are loaded into the appropriate registers by executing a single load instruction. The output data from a convolution can be stored into 32b GPRs.

Various advantages of the disclosed techniques and systems include the ability to efficiently store vectors of 8b, 16b, and 32b data types of the same shader in GPRs. Additionally, various embodiments can support storage of multiple different complex data in multiple different register types. For example, in various embodiments, any or all of the following register types can be used for storing complex data, enabling a single shader core to support 2× or 4× fast convolutions: v1f32 (32b full-precision floating point data), v1s32 (32b, signed, full-precision fixed point data), v1u32 (32b, unsigned, full-precision fixed point data), v2f16 (16b, floating point, two-component vector data), v4u8 (8b, unsigned, four-component vector data), v8u8 (8b, unsigned, eight-component vector data), v4f16 (16b, floating point, four-component vector data), and v2f32 (32b, floating point, two-component vector data).

As disclosed and discussed herein, various embodiments of a method of storing data in general purpose registers (GPRs) includes packing a tile of data items into the GPRs, where the tile of data items includes multiple channels. The tile of data items can include a pixel block.

The term "channel" is a term used by those skilled in the art of performing mathematical convolutions on data, including, but not limited to, performing convolutions on image data. For example, when dealing with Red, Blue, Green (RGB) image data, the data may be arranged in a block x pixels long by y pixels wide, with each pixel having 3 channels. Each channel can be considered to be a particular interpretation of that image. For example, the "red" channel interprets the "redness" of each pixel, the "blue" channel interprets the "blueness" of each pixel, and the "green" channel interprets the "greenness" of each pixel.

The RGB example above is provided for ease of understanding, but the term "channel" is not actually limited to colors of image data. For example, an image with 64 channels has 64 different interpretations of that image, but those interpretations need not be related to color, or even to pixel data. In some cases, each channel can correspond to a vector dimension. Explanations of vector dimensions are beyond the scope of this disclosure, but are well understood by those of ordinary skill in the art.

Packing the tile into a GPR includes reading the tile of data items from memory, storing at least two channels of data in a first GPR, storing at least two additional channels of data in a second GPR, and loading auxiliary data into a third GPR.

In at least one implementation, when the tile of data items includes 16b data items, and the first GPR and the second GPR are 32b registers, two channels are packed into each of the first GPR and the second GPR. In some implementations, when the tile of data items includes 8b data items, and the first GPR and the second source-GPR are 32b registers, 4 channels are packed into each of the first GPR and the second GPR. Packing data into registers, as disclosed by various examples and illustrations provided herein, provides a way to arrange data to be processed in a format that is better adapted for use in the convolution process.

In yet other aspects of the above described embodiments, loading auxiliary data into a third source-GPR includes storing the auxiliary data in a 64b GPR. In various embodiments, the tile of data items has a tile size defined as R×C, where R is the number of pixel rows and C is the number of pixel columns, and the auxiliary data includes a pixel block that is half the tile size. In these embodiments, an auxiliary pixel block can have a size that is either (R/2)×C or R×(C/2). For example, auxiliary data can include auxiliary pixels need for convolution operations involving a pixel block, so that when a 4×8 tile is involved, the auxiliary pixel block can be organized as 8×2 tile or a 2×8 tile prior to being loaded into the 64b GPR.

Any or all of the above embodiments can include both packing the tile of data items into the source GPRs, and the loading the auxiliary data into other source GPRs, in response to a single load instruction. In particular implementations, the first source-GPR and the second source-GPR are full precision GPRs In yet another aspect of any or all of the above embodiments, a convolution operation can be performed using the first source-GPR, the second source-GPR, and third source-GPR. The results of a convolution operation can be stored in a half-precision destination GPR.

A processing device used to implement the above embodiments can include a single instruction multiple data (SIMD) arithmetic logical unit (ALU) configured to perform a convolution using data stored in general purpose registers (GPRs), a first source-GPR storing packed tile data, the packed tile data including at least two channels included in a tile of data items, a second source-GPR storing at least two additional channels included in the tile of data items, and a third source-GPR storing auxiliary data associated with the tile data.

The processing device discussed above can also include a destination GPR configured to store a result of the convolution. In various embodiments, the destination GPR is selected from the group consisting of: a 16b, floating point, two-component vector (v2f16) GPR; a 16b, signed, two-component vector (v2s16) GPR; and a 16b, unsigned, two-component vector (v2u16) GPR; a 32b, signed, full-precision fixed point (v1s32) GPR; a 32b, unsigned, full-precision fixed point (v1u32) GPR; and a 32b full-precision floating point (v1f32) GPR.

In at least one embodiment, convolution results are stored in storing a result of the convolution operation in one of a 32b full-precision fixed point GPR, a 32b full-precision floating point GPR, a 32b packed half-precision floating point GPR, or 32b packed half-precision fixed point GPR, while source data is stored in a GPRs selected from the group consisting of: a 32b full-precision floating point (v1f32) GPR; a 32b, signed, full-precision fixed point (v1s32) GPR; a 32b, unsigned, full-precision fixed point (v1u32) GPR; a 16b floating point two-component vector (v2f16) GPR; an 8b, unsigned, four-component vector (v4u8) GPR, an 8b, unsigned, eight-component vector (v8u8) GPR; a 16b, floating point, four-component vector (v4f16) GPR; and a 32b, floating point, two-component vector (v2f32) GPR.

In some or all of the above embodiments, when executing a non-convolution shader on a processor, scalar pixel data can be stored in general purpose registers (GPRs), but when executing a convolution shader on that same processor, pixel data can be stored as packed pixel data in the GPRs.

DETAILED DESCRIPTION OF ILLUSTRATIVE EMBODIMENTS

Figure 2:
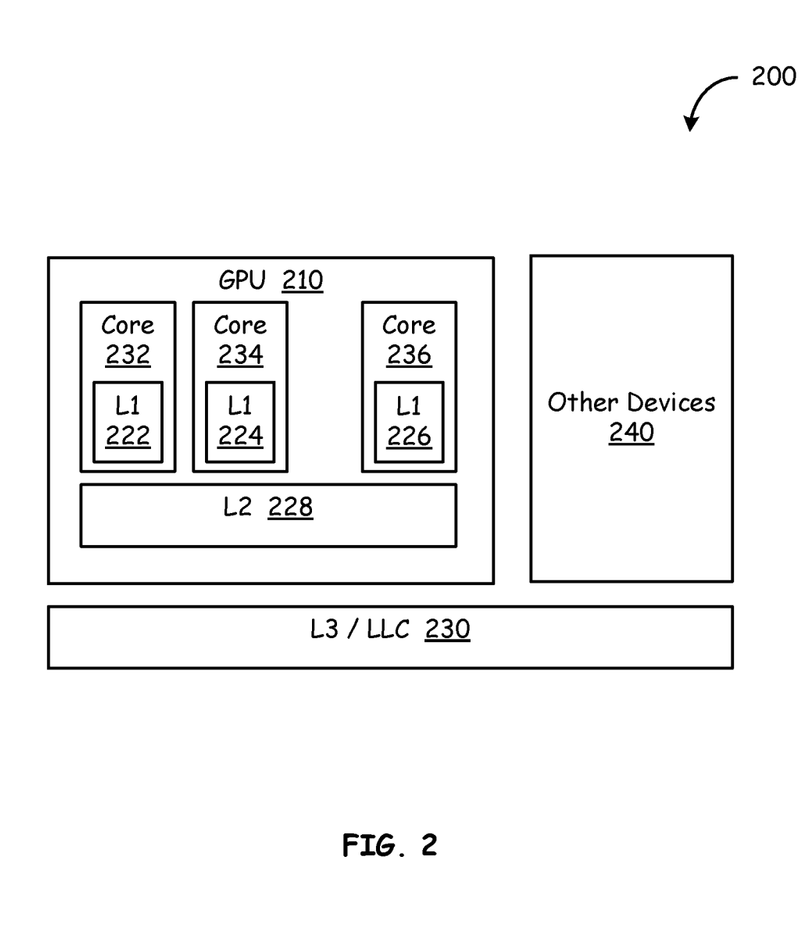
FIG. 2 is a block diagram illustrating a processing system including a graphics processing unit (GPU) including multiple shader (processing) cores, in accordance with various embodiments of the present disclosure.

Referring to FIG. 2, a block diagram illustrating a processing system including a graphics processing unit (GPU) including multiple shader (processing) cores, or simply processing cores, is illustrated, in accordance with various embodiments of the present disclosure. In various embodiments, processing system 200 can be implemented in, among other things, desktop computers, laptop computers, gaming appliances, smart phones, feature phones, televisions, set-top boxes, tablets, watches, virtual reality appliances, graphics processing cards or assemblies suitable for inclusion in larger or more comprehensive systems, or the like.

Processing system 200 includes GPU 210, Level 3 cache 230, and other devices 240. GPU 210 includes processing cores 232, 234, and 236; and Level 2 cache 228. Each of the processing cores 232, 234, and 236 includes corresponding Level 1 caches 222, 224, and 226.

In the graphics processing arts, the term "shader" is used to refer to either shader-type software, or the hardware on which the shader-type software is executed. This dual use of the term can cause confusion, unless the context is considered. As used herein, the term "shader" refers to a particular class or type of program, while "shader core" is used to refer to the processing units that execute a shader.

Shaders derive their name from their original function—which was to determine appropriate levels of light, darkness, and color within an image. However, even though the term "shader" is still used to refer to programs that provide graphics shading functionality, shaders are currently used to perform a variety of additional functions unrelated to shading, and in some cases unrelated to graphics at all. The term "convolution shader" refers to a shader that performs a convolution operation on multiple matrices, which can include vectors. The term "non-convolution shader" refers to a shader that achieves its function without performing a convolution operation.

As used herein, the term "shader core" is sometimes used interchangeably with the term processing core. Although the term shader core has been commonly used in the past to refer to processing units dedicated to calculating vertex or pixel shading in a graphics environment, as used herein, the term "shader core" is not necessarily limited to performing processing in a graphics environment. Instead, the term shader core is used to refer to a processing core that is specially configured to perform the type of parallel processing that is typically performed in graphics processing. Because the use of conventional shader cores is so common in GPU's, the majority of this disclosure is discussed in the context of GPUs and shader cores, even though many, if not all, of the embodiments disclosed herein can be implemented in single instruction multiple data (SIMD) processors other than GPUs.

Other devices 240 can include a general purpose microprocessor, application specific integrated circuits (ASICs), central processing unit (CPU) used by processing system 200, and discrete logic circuitry. Additionally, other devices 240 can include various types of memory circuits, chips, solid state drives, including but not limited to random access memory (RAM), static RAM (SRAM), dynamic RAM (DRAM), read only memory (ROM), electrically erasable programmable read only memory (EEPROM), user input/output devices, wireless and wired network interfaces, and like. Various portions of processing system 200 can be interconnected using communication buses or other types of electrical connections employing various protocols, as well as using any suitable type of communication protocol. Some or all of the illustrated components of processing system 200 can be implemented on a single semiconductor surface substrate (i.e. on the same chip), in assemblies including multiple chips, or some combination thereof.

Figure 3:
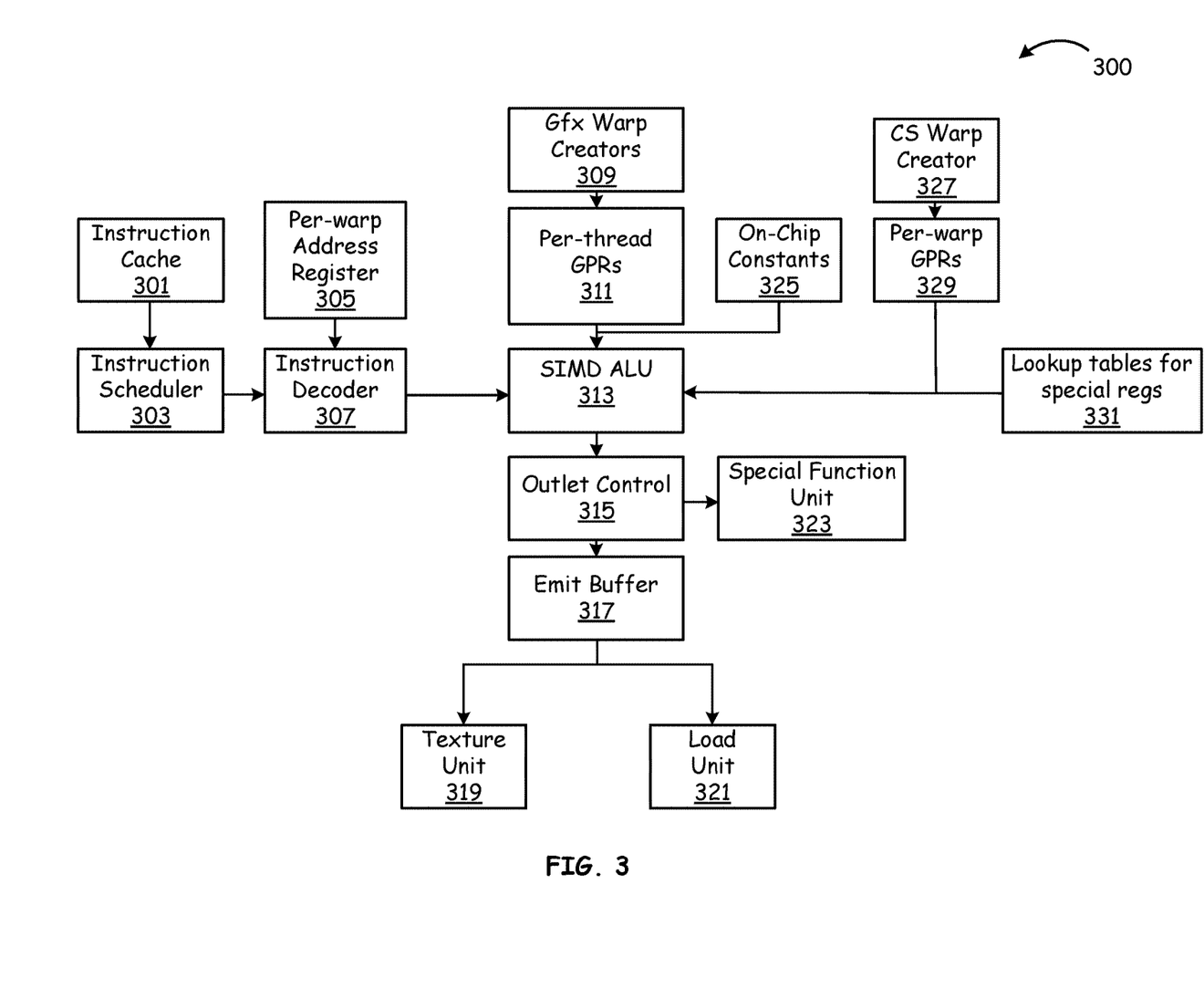
FIG. 3 is a block diagram illustrating a shader (processing) core, in accordance with various embodiments of the present disclosure.

Referring next to FIG. 3, a block diagram illustrating a shader (processing) core will be discussed in accordance with various embodiments of the present disclosure. Processing core 300 is illustrated as a single instruction multiple data (SIMD) processing core that includes a SIMD arithmetic logic unit (ALU) 313 capable of performing the same operation on multiple data elements in parallel, e.g. at substantially the same time.

Processing core 300 also includes instruction scheduler 303, which obtains instructions from instruction cache 301, and provides the instructions to instruction decoder 307. Instruction decoder 307, which can be, for example, a combinatorial circuit, uses information included in per-warp address register 305 to decode instructions obtained from instruction scheduler 303. Instruction decoder 307 can provide the decoded instruction to SIMD ALU 313. Decoding the instruction can include, among other things, translating instruction codes obtained from instruction scheduler 303 into addresses from which the appropriate instruction can be obtained.

SIMD ALU 313 obtains data to be processed from per-thread general purpose registers (GPRs) 311 and on-chip constants storage 325. The data stored in the per-thread GPRs is obtained from graphics (Gfx) warp creators 309. In general, Gfx warp creators 309 organize graphics processing threads into groups, or warps that can be executed in parallel by SIMD ALU 313. Gfx warp creators can function to generate thread and warp identifiers based on information obtained from various state registers (not illustrated). Thus, if a SIMD ALU is capable of processing 32 threads concurrently (SIMD32), 32 threads can be grouped into a warp by Gfx warp creators 309. Data associated with each of the 32 different threads in the warp can be stored in corresponding per-thread GPRs.

In some embodiments, SIMD ALU 313 also obtains data from lookup tables for special registers 331 and per-warp GPRs 329. The lookup tables can be, in various embodiments, stored in a non-volatile memory, e.g., persistent tables stored as firmware, or loaded into a volatile memory during a system boot process or as part of a software program initialization. Convolution shader (CS) warp creator 327, like graphics (Gfx) warp creators, organizes threads into warps for concurrent processing, which can include generating identifiers. However, the data organized by CS warp creator 327 is normally related to convolution threads, rather than graphics processing threads, and is loaded into per-warp GPRs, instead of into per-thread GPRs.

The results generated by SIMD ALU 313 processing the warps can be sent to outlet control 315, which directs the results to special function unit 323 or emit buffer 317. Special function unit 323 can be used, for example, to implement transcendental instructions or functions, such as sin, cosine, reciprocal, and square root functions. Emit buffer 317 can be used to emit the results to texture unit 319 or load unit 321.

Texture unit 319 applies texture operations to pixels. Load unit 321 can be a load-store unit responsible for executing load and/or store instructions, generating virtual addresses of load and store operations, loading data from a memory, or storing data back to memory from registers or emit buffer 317.

Figure 4:
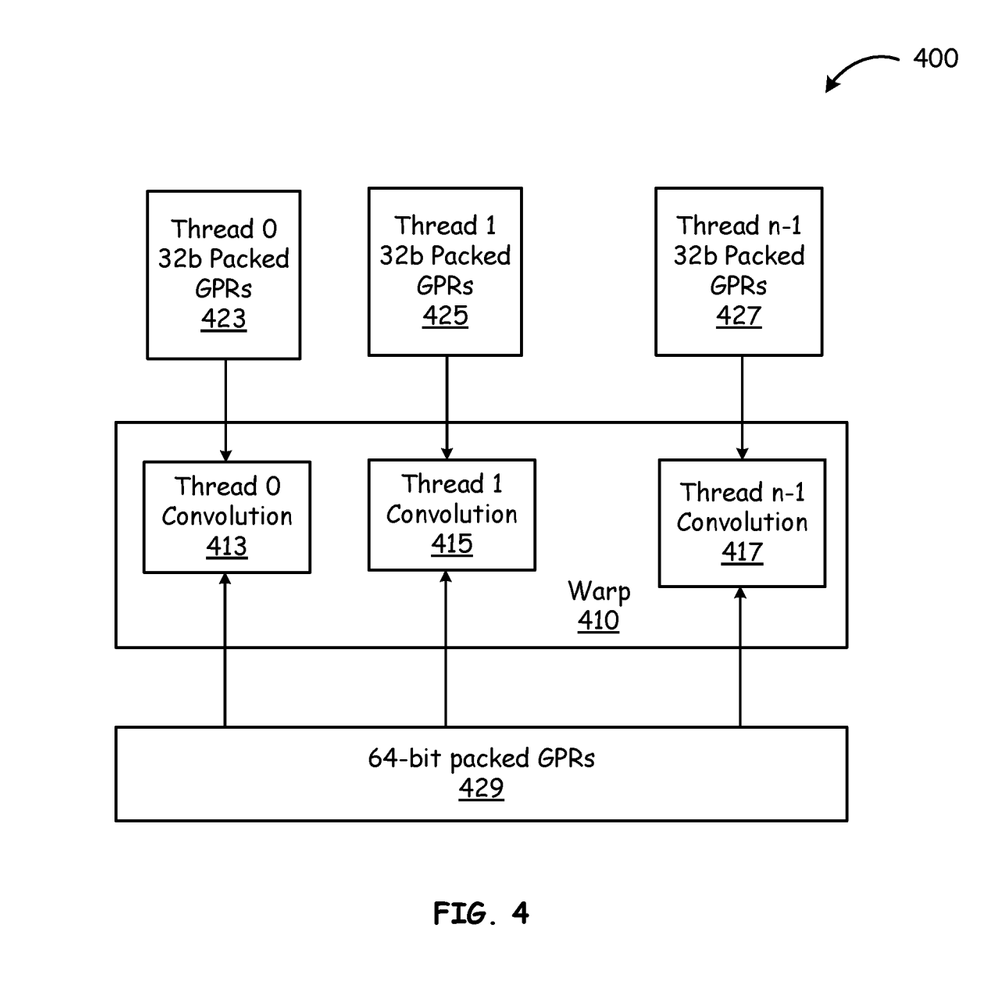
FIG. 4 is a block diagram illustrating a system employing packed 32b general purpose registers (GPRs) to store tile data, and packed 64b GPRs to store auxiliary pixels, in accordance with various embodiments of the present disclosure.

Referring next to FIG. 4, a system 400 employing packed 32b general purpose registers (GPRs) to store primary, or tile data such as pixel data, and packed 64b GPRs to store auxiliary data, such as auxiliary pixel data, will be discussed in accordance with various embodiments of the present disclosure. As used herein, the term complex data is generally used to refer to vector data.

System 400 includes a processing device including a sufficient number of processing cores, for example processing core 300 (FIG. 3), to allow processing of warp 410, which includes Thread 0 through Thread n–1.

In at least one embodiment, system 400 includes one or more GPRs for each thread capable of being processed in parallel. These GPRs are sometimes referred to herein as "source-GPRs," because they are used to hold source data used for performing a convolution operation. In the illustrated example, system 400 includes Thread 0 32b packed GPRs 423, Thread 1 32b packed GPRs 425, and Thread n–1

32b packed GPRs 427. In various embodiments, each of these packed source-GPRs can be implemented on a per-thread basis.

In addition to packed source-GPRs 423, 425, and 427, system 400 includes 64b packed GPRs 429. These 64b packed GPRs are also referred to herein as "source-GPRs," because the 64b packed GPRs are used to hold source data for a convolution operation. In at least one embodiment, the 64b packed GPRs are implemented on a per-warp basis, but may also be implemented on a per-thread basis.

In general, the present disclosure focuses on 32b and 64b registers, but the techniques used with 32b and 64b registers can be expanded to 64b and 128b registers, or even other register sizes, if a particular processing system includes those sizes of general purpose registers.

In various embodiments, convolution operations are performed on data associated with each thread by a processing unit, for example SIMD ALU 313 (FIG. 3), using data from the source GPRs. In the illustrated example, the source GPRs associated with Thread 0 include 32b packed GPRs 423 and 64b packed GPRs 429. In various embodiments, the data stored in 32b packed GPRs is the primary data to be convolved, such as pixel data, wavelet data, or the like. In those same embodiments, the data stored in 64b packed GPRs is auxiliary data needed for performing a convolution operation on the data stored in the 32b packed GPRs, such as data related to surrounding pixels or data associated with wavelet edges or endpoints.

The way in which the data is packed into the source GPRs can depend on the type, size, and organization of the primary and auxiliary data in memory, and will be discussed in greater detail below. In at least some embodiments, data can be stored in the source-GPRs as either scalar data or packed data, depending on the data being stored in the source-GPRs. For example, if data to be stored in the source-GPRs includes multiple channels of vector data, the data can be packed in the source-GPRs based on the number of channels and type of data. However, if the data to be stored in the source-GPRs does not include multiple channels of vector data, the data can be stored in a scalar fashion. Allowing data to be either packed or scalar can provide a wider range of backwards compatibility, future scalability, and the ability to operate efficiently on varying data types.

Although not specifically illustrated in FIG. 4, the results of each convolution process can be output to 32b packed GPRs, (output GPRs), which may be the same or different registers than those used as source-GPRs. Packing the data in the source-GPRs and output-GPRs as disclosed herein makes it more efficient for processing by a single instruction multiple data (SIMD) and other, similar, parallel processing systems. In various embodiments, the output GPRs can store either packed data or scalar data.

Figure 5A:
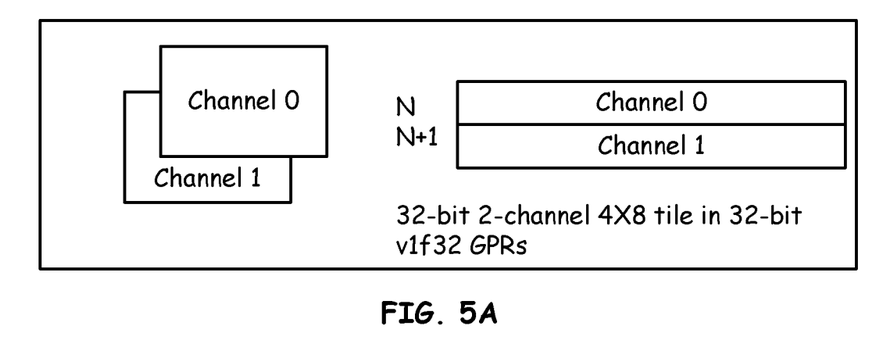
FIGS. 5A-5E are diagrams illustrating various of organizing and packing data into general purpose registers (GPRs), in accordance with various embodiments of the present disclosure.
Figure 5B:
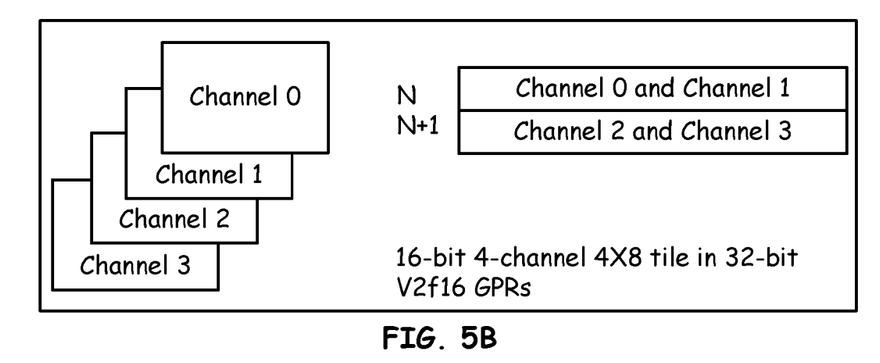
Figure 5C:
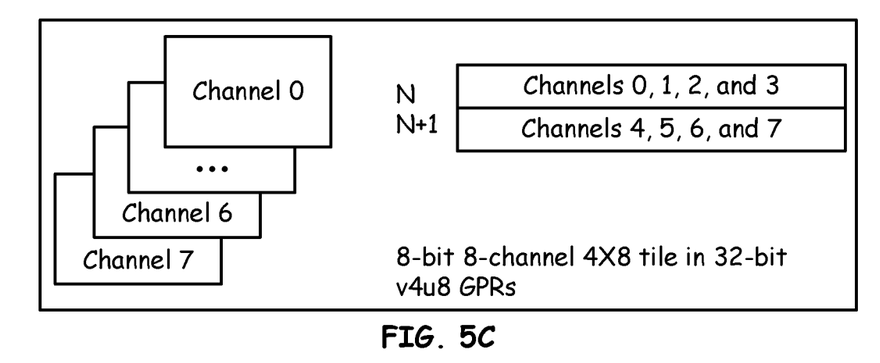

Referring next to FIGS. 5A-5E examples of organizing and packing data into general purpose registers (GPRs) will be discussed in accordance with various embodiments of the present disclosure. FIGS. 5A-5C provide examples of packing 4×8 tiles of primary data to be convolved, such as pixel data, into source-GPRs. In general, channels 0 through n−1 of a 4×8 tile can be stored in GPR slot N. Channels n through 2n−1 of the 4×8 tile are stored in GPR slot N+1. Thus, a tile stored in a GPR consists of channels 0 through 2n−1, where n can be 1, 2, or 4. Although the following examples are illustrated suing 4×8 data tiles, the techniques described herein are not necessarily limited to 4×8 tiles, and other tiled data arrangements can be used consistent with the teachings set forth herein.

Consider, as a first example, FIG. 5A, which illustrates 2 channels of 32b data arranged into 4×8 tiles being stored in 32b v1f32 GPRs. In the illustrated embodiment, the first channel of data (channel 0) is stored in GPR slot N, while the second channel of data (channel 1) is stored in GPR slot N+1.

Next consider, FIG. 5B, which illustrates 4 channels of 16b data arranged into 4×8 tiles being stored in 32b v2f16 GPRs. In this embodiment, the first and second channels of data (channels 0 and 1) are stored in GPR slot N, while the third and fourth channels of data (channels 2 and 3) are stored in a GPR slot N+1.

Now consider FIG. 5C, which illustrates 8 channels of 8 bit data arranged into 4×8 tiles being stored in 32b v4u8GPRs. In this embodiment, the first four channels of data (channels 0-3) are stored in GPR slot N, while the next four channels of data (channels 4-7) are stored in a GPR slot N+1.

Figure 5D:
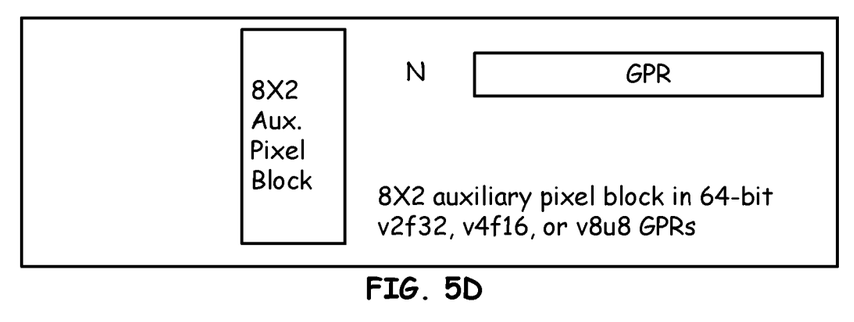
Figure 5E:
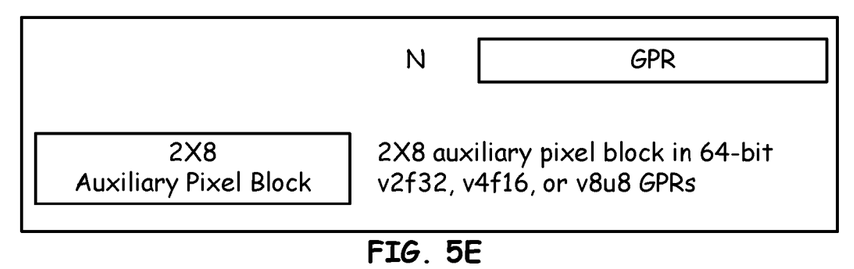

FIGS. 5D-5E provide examples of packing blocks of auxiliary data, for example auxiliary pixel blocks, into GPRs. FIG. 5D, for example, illustrates storing an 8×2 auxiliary pixel block in 64b v2f32, v4f16, or v8u8 GPRs. For 8b data, channels 0-7 of the 8×2 auxiliary pixel block are stored in v8u8 GPRs. For 16b data, channels 0-4 of the 8×2 auxiliary pixel block are stored in v4f16 GPRs. For 32b data, channels 0-1 of the 8×2 auxiliary pixel block are stored in v2f32 GPRs.

FIG. 5E illustrates storing a 2×8 auxiliary pixel block in 64b v2f32, v4f16, or v8u8 GPRs. For 8b data, channels 0-7 of the 2×8 auxiliary pixel block are stored in v8u8 GPRs. For 16b data, channels 0-4 of the 2×8 auxiliary pixel block are stored in v4f16 GPRs. For 32b data, channels 0-1 of the 2×8 auxiliary pixel block are stored in v2f32 GPRs.

With respect to destination GPRs, which are not specifically illustrated, half-precision data can be used to represent packed destination GPRs. In various embodiments up to 192 packed destination GPRs are used, where R0 represents register 0, R1 represents register 1, and so forth: R0.v2f16/R0.v2s16/R0.v2u16, R1.v2f16/R1.v2s16/R1.v2u16, . . . , R191.v2f16/R191.v2s16/R191.v2u16.

Full-precision data can be used to represent the packed source GPRs. In various embodiments up to 192 packed source GPRs are used, where R0 represents register 0, R1 represents register 1, and so forth: R0.v2f16/R0.v2s16/R0.v2u16, R1.v2f16/R1.v2s16/R1.v2u16, . . . , R191.v2f16/R191.v2s16/R191.v2u16.

Table 1, presented below, shows operation types based on precision encodings, in accordance with various embodiments of the present disclosure. In various embodiments, if a destination GPR is a half precision GPR, all sources are packed, and the destination is packed as well.

TABLE 1

Operation types based on precision encodings

| DESTINATION PRECISION | SOURCE PRECISION | COMMENT |
|---|---|---|
| Half GPR 0-191 | Half | Reserved |
| Half GPR 0-191 | Full, R0-R191 | Every operand is packed. 2x speed. |
| Otherwise (Full, wGPR, P0, TP0, etc.) | Half, H0-H223 | Regular full-precision operation with source promotion |
| Otherwise (Full, wGPR, P0, TP0, etc.) | Full, R0-R191 | Regular full-precision operation |

In various embodiments, an auxiliary pixel block is half of the tile in size. For example, if the tile is 4×8, an auxiliary pixel block of the tile is either 2×8 or 8×2. If the tile is 8×8, an auxiliary pixel block of the tile is either 4×8 or 8×4. This is because a GPR slot has a fixed size, tile data is stored as 32b data, and auxiliary data is stored as 64b data. For example, a GPR slot has 1024 bits, a tile is 4×8, and an auxiliary pixel block is 2×8. We execute the tile in a single warp which has 32 threads. Each pixel of the tile is processed by a thread of the warp. A GPR slot in the SIMD unit holds a scalar 32b GPR of 32 threads for tile data. In this case, the size of the GPR slot totals 32 pixels times 32 bits, or 32 threads times 32 bits, or 1024 bits. For an auxiliary pixel block, however, a GPR slot in the SIMD unit holds 16 64b GPRs which are not aligned to threads. However, the size of the GPR slot is the same. It is 16 pixels times 64 bits (1024 bits).

Tables 2 and 3, presented below, describe 32-bit data types for tile data, and 64b data types for auxiliary data, according to various embodiments of the present disclosure. The discussion immediately following Tables 2 and 3 provide a summary of some of the primary differences between tile data and auxiliary data. Note that other differences may exist.

TABLE 2

32b data types for tile data

| Data type | Description |
|---|---|
| v4q8 | 32b word of type q8 (8b quantized). It holds four q8 values from four channels respectively. |
| v2f16 | 32b word of type f16. It holds two f16 values from two channels respectively. |
| v1f32 | 32b word of type f32. It holds one f32 value from one channel. |

TABLE 3

64b data types for auxiliary data

| Data type | Description |
|---|---|
| v8q8 | 64b word of type q8 (8b quantized). It holds eight q8 values from eight channels respectively. |
| v4f16 | 64b word of type f16. It holds four f16 values from four channels respectively. |
| v2f32 | 64b word of type f32. It holds two f32 values from two channels respectively. |

Tile data is required for filter dimensions. However, auxiliary data is optional depending on filter dimensions. A filter generally uses one tile. However, that same filter may need zero, one, or multiple auxiliary pixel blocks.

In various embodiments, if a tile of data is R×C (R is the number of rows and C is the number of columns in pixels), an auxiliary pixel block of the tile is either (R/2)×C or R×(C/2).

A tile and its auxiliary pixel blocks have the same number of channels. The number of channels is typically 8 for 8b tiles, 4 for 16b tiles, and 2 for 32b tiles.

A tile typically takes two GPR slots. An auxiliary pixel block of the tile typically takes one GPR slot.

If a GPR slot for a tile holds N channels, a GPR slot for an auxiliary pixel block of the tile holds (2*N) channels. For example, for a 16b 4×8 tile, a GPR slot holds 32 pixels times 2 channels times 16 bits or 32 threads times 32 32b words. For an auxiliary pixel block of the tile which is 2×8, a GPR slot holds 2×8 pixels times 4 channels times 16 bits.

Figure 6:
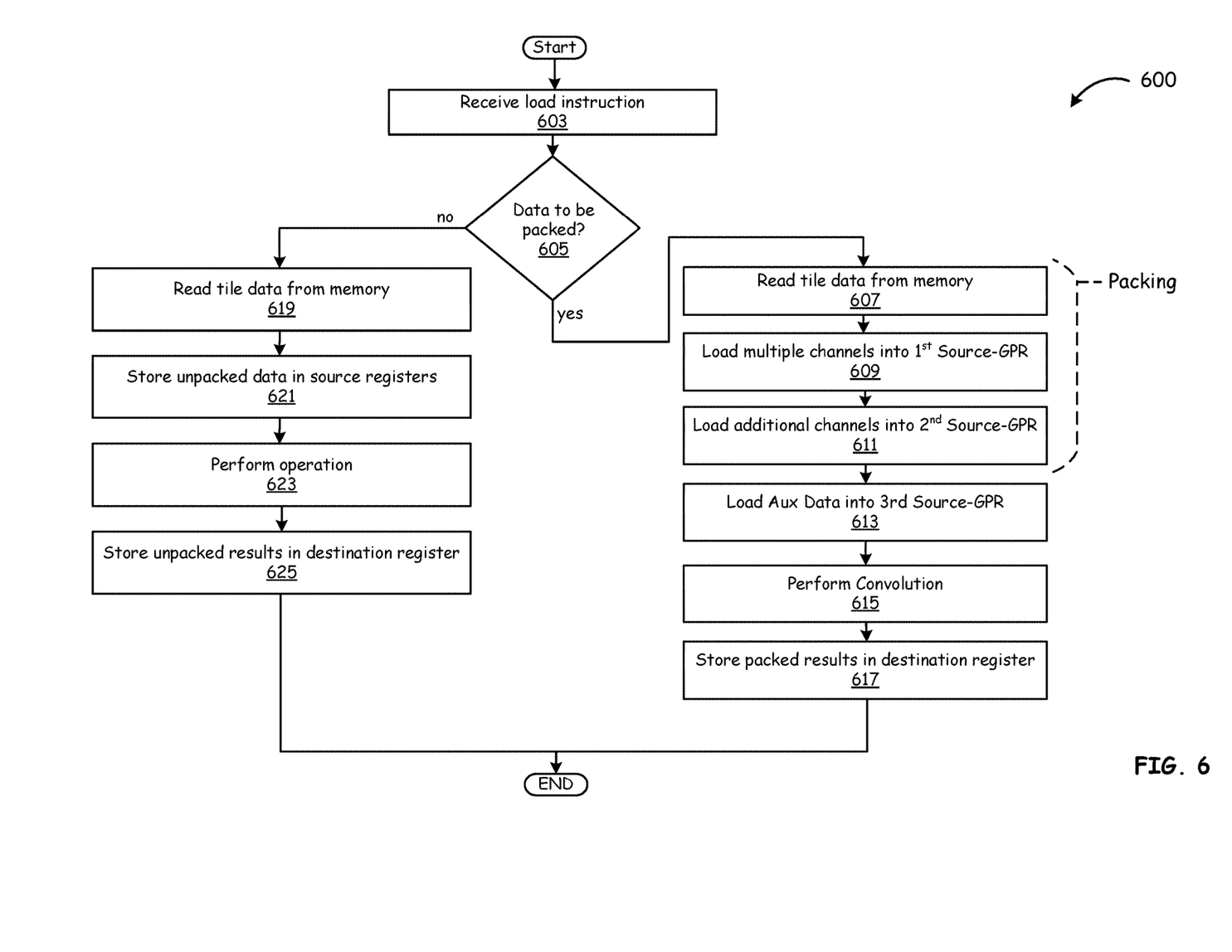
FIG. 6 is a flowchart illustrating a method of packing complex data into general purpose registers, in accordance with various embodiments of the present disclosure.

Referring next to FIG. 6 a method 600 for packing complex data into general purpose registers (GPRs) will be discussed in accordance with various embodiments of the present disclosure. As illustrated by block 603, a load instruction is received. At block 605, a determination is made regarding whether the data is to be packed. The determination regarding whether to pack the data can be based on an operation associated with the load instruction, whether the data to be loaded is vector data, the registers specified by the load instruction, or by a type of the load instruction. In at least one embodiment, a single load instruction can be used to pack primary, or pixel data, into 32b source-GPRs, and to load auxiliary data into 64b source GPRS.

As illustrated by block 619, if data is not to be packed, for example when only a single channel of tiled data is to be stored in a single GPR, the data tile is read from memory, and the unpacked data can be stored in source-GPRs, as illustrated by block 621. A processing operation can be performed on the data, as illustrated by block 623, and the unpacked results can be stored in a destination register, as illustrated by block 625.

If it is determined at block 605 that data is to be packed, for example where multiple channels of tiled data are to be stored in a single source register, the tile data is read from a memory, as illustrated by block 607, and multiple channels of the tiled data are stored in a first source-GPR, as shown by block 609. Additional channels of the tiled data are loaded into a second source-GPR, as illustrated by block 611. The tiled data packed into the first two source GPRs is sometimes referred to herein as primary data, and can consist of pixel data in some embodiments.

As illustrated by block 613, auxiliary data can be loaded into a third source-GPR, and a convolution operation can be performed using the primary and auxiliary data, as shown by block 615. The results of the convolution can be packed into destination GPRs in a manner similar to the way in which the primary data is packed into the source-GPRs, as illustrated by block 617.

Figure 7:
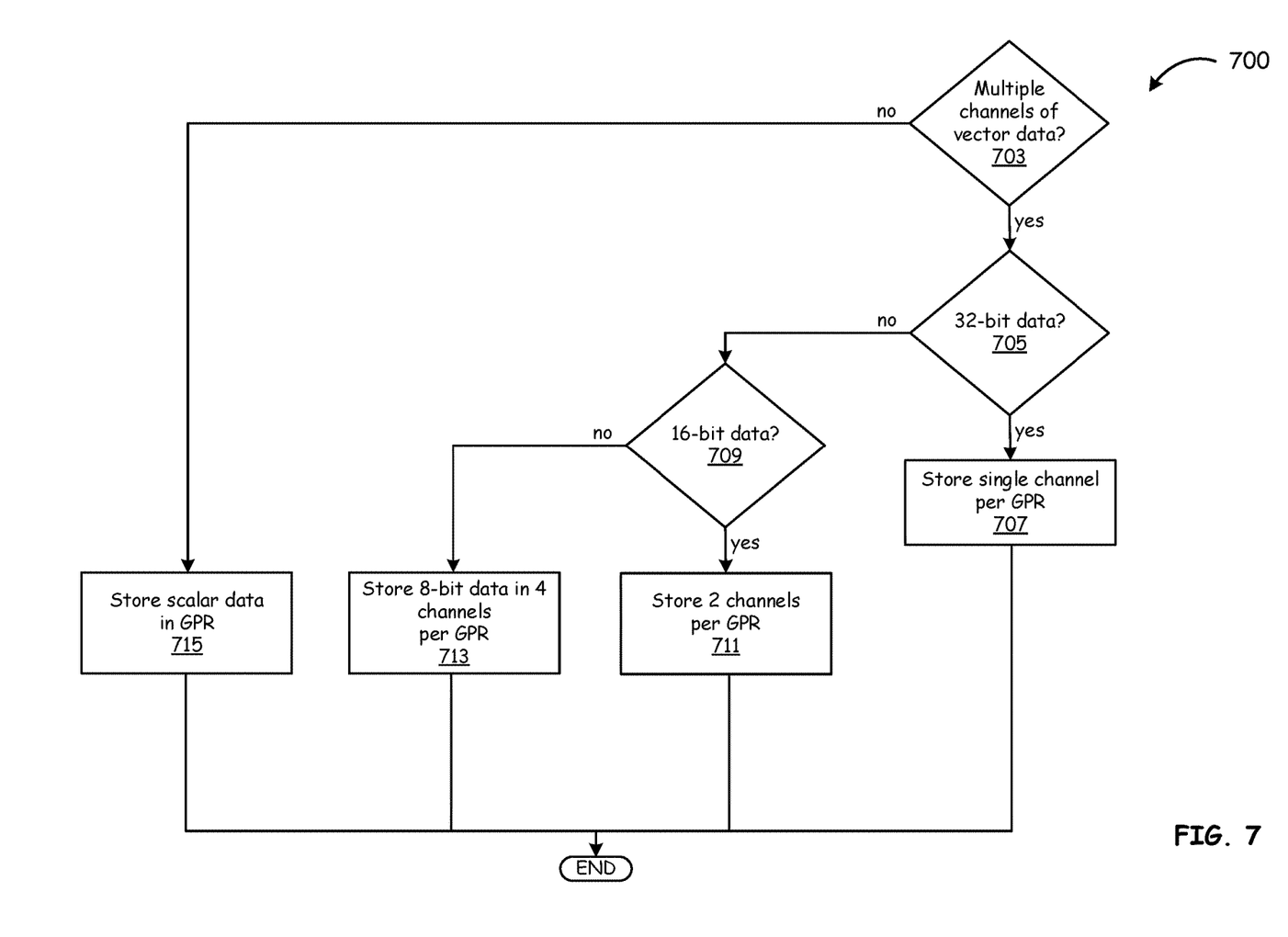
FIG. 7 is a flowchart illustrating a method of determining how data is to be organized and stored in general purpose registers (GPRs), in accordance with various embodiments of the present disclosure.

Referring next to FIG. 7, a method 700 of determining how data is to be organized and stored in general purpose registers (GPRs) will be discussed in accordance with various embodiments of the present disclosure. As illustrated by block 703, a determination is made regarding whether there are multiple channels of vector data to be loaded into a register. This determination can be made based on an explicit identification of data type, based on a type of register to be used, based on an operation being performed, based on an operand included in a load instruction, based on a type of operation associated with the load instruction, or the like.

If multiple channels of vector data are not to be packed into a single GPR for processing, method 700 proceeds to block 715, and scalar data is stored in the GPR. If, however, block 703 indicates that some or all of the data to be loaded into GPRs will require loading multiple channels of vector, method 700 proceeds to block 705. If it is determined at block 705 that the data is 32b data, each channel data will be stored in a single 32b GPR, as shown by block 707, otherwise method 700 proceeds to block 709.

At block 709, a determination is made regarding whether the data is 16b data. If the data is 16b data, two channels of the data are stored per GPR, as illustrated by block 711. If the data is neither 32b nor 16b, method 700 assumes the data is 8b, and proceeds to block 713, where 4 channels of the 8b data are stored per GPR.

Table 4, below illustrates various combinations of source and destination data types that are useful in implementing various embodiments discussed herein.

TABLE 3

64b data types for auxiliary data

| Destination | Source | comments |
|---|---|---|
| s32 | v4q8 and v8q8 | |
| v2f16.lo | v4q8 and v8q8 // | write to the lower 16 bits of v2f16 |
| v2f16.hi | v4q8 and v8q8 // | write to the upper 16 bits of v2f16 |
| v2f16.lo | v2f16 and v4f16 | |
| v2f16.hi | v2f16 and v4f16 | |
| f32 | f32 and v2f32 | |
| v2f16 | v4q8 and v8q8 | |
| v2f16 | v2f16 and v4f16 | |

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure), or they may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A method comprising:
   packing, into general purpose registers (GPRs), a tile of data items including a plurality of channels for a first data item of the tile of data items, the packing including:
      storing at least one channel of the plurality of channels for the first data item in a first source-GPR; and
      storing at least one additional channel of the plurality of channels for the first data item in a second source-GPR;
   loading auxiliary data into a third source-GPR; and
   performing a convolution operation using the first source-GPR, the second source-GPR, and the third source-GPR,
   wherein the auxiliary data includes a pixel block that is half a tile size of the tile of data items, and wherein the packing and the loading are performed in response to a single load instruction.

2. The method of claim 1, further comprising:
   packing two channels into each of the first source-GPR and the second source-GPR when the tile of data items includes 16b data items, and the first source-GPR and the second source-GPR include 32b registers.

3. The method of claim 1, further comprising:
   packing four channels into each of the first source-GPR and the second source-GPR when the tile of data items includes multiple of 8b data items, and the first source-GPR and the second source-GPR include 32b registers.

4. The method of claim 1, wherein the loading the auxiliary data into the third source-GPR includes:
   storing the auxiliary data as 64b data.

5. The method of claim 1, wherein:
   the tile of data items has the tile size defined as R×C, wherein R is a number of pixel rows, and C is a number of pixel columns.

6. The method of claim 1, further comprising:
   storing a result of the convolution operation in one of a 32b full-precision fixed point GPR, a 32b full-precision floating point GPR, a 32b packed half-precision floating point GPR, or 32b packed half-precision fixed point GPR.

7. The method of claim 1, wherein:
   the first source-GPR and the second source-GPR include full precision GPRs.

8. The method of claim 1, wherein:
   the tile of data items includes the pixel block; and
   the auxiliary data includes auxiliary pixels needed for convolution operations involving the pixel block.

9. The method of claim 1, the storing the at least one channel comprising storing at least two channels of the plurality of channels in the first source-GPR, and the storing the at least one additional channel comprising storing at least two additional channels of the plurality of channels in the first source-GPR.

10. The method of claim 1, wherein the tile of data items includes a block of pixels, wherein the auxiliary data includes surrounding pixels of the block of pixels for image filtering, and wherein the plurality of channels includes a plurality of color channels.

11. A processing device comprising:
    a single instruction multiple data (SIMD) arithmetic logical unit (ALU) configured to perform convolution operations using data stored in general purpose registers (GPRs);
    a first source-GPR for storing packed tile data, the packed tile data including at least one channel for a first data item included in a tile of data items;
    a second source-GPR for storing at least one additional channel for the first data item included in the tile of data items; and
    a third source-GPR for storing auxiliary data associated with the packed tile data,
    wherein the SIMD ALU is configured to perform a first convolution operation of the convolution operations using the first source-GPR, the second source-GPR, and the third source-GPR, and
    wherein the auxiliary data includes a pixel block that is half a tile size of the tile of data items, and wherein the storing the packed tile data, the storing the at least one additional channel, and the storing the auxiliary data are performed in response to a single load instruction.

12. The processing device of claim 11, further comprising:
    a destination GPR configured to store a result of the convolution operations.

13. The processing device of claim 12, wherein:
    the destination GPR is selected from a group consisting of:
      a 16b, floating point, two-component vector (v2f16) GPR;
      a 16b, signed, two-component vector (v2s16) GPR;
      a 16b, unsigned, two-component vector (v2u16) GPR;
      a 32b, signed, full-precision fixed point (v1s32) GPR;
      a 32b, unsigned, full-precision fixed point (v1u32) GPR; and
      a 32b full-precision floating point (v1f32) GPR.

14. The processing device of claim 11, wherein:
    each of the first source-GPR, the second source-GPR, and the third source-GPR is one of a group consisting of:
      a 32b full-precision floating point (v1f32) GPR;
      a 32b, signed, full-precision fixed point (v1s32) GPR;
      a 32b, unsigned, full-precision fixed point (v1u32) GPR;
      a 16b floating point two-component vector (v2f16) GPR;

an 8b, unsigned, four-component vector (v4u8) GPR;
an 8b, unsigned, eight-component vector (v8u8) GPR;
a 16b, floating point, four-component vector (v4f16) GPR; and
a 32b, floating point, two-component vector (v2f32) GPR.

15. A processing device comprising:
at least one processor; and
a non-transitory computer readable storage medium having instructions stored thereon that, when executed by the processing device, cause the processing device to perform operations, the operations comprising:
storing packed tile data in at least one general purpose register (GPR), the packed tile data including at least one channel for a first data item included in a tile of data items, the at least one GPR including a full-precision GPR;
storing auxiliary data in a second GPR different from the at least one GPR, the auxiliary data associated with the packed tile data;
performing a convolution operation using the packed tile data and the auxiliary data; and
storing a packed result of the convolution operation in a half-precision GPR,
wherein the auxiliary data includes a pixel block that is half a tile size of the tile of data items, and wherein the storing the packed tile data and the storing the auxiliary data are performed in response to a single load instruction.

16. The processing device of claim 15, further including:
a 32b GPR for storing the packed tile data;
a 64b GPR for storing the auxiliary data; and
a 32b GPR for storing the packed result.

17. A method comprising:
packing, into general-purpose source registers associated with a single instruction multiple data (SIMD) processor, a tile of data items, the packing the tile of data items comprising:
packing at least one channel of a data item of the tile of data items into a first general-purpose source register of the general-purpose source registers; and
packing at least one additional channel of the data item into a second general-purpose source register of the general-purpose source registers;

storing auxiliary data in a third general-purpose source register different from the general-purpose source registers, used in a convolution process associated with the tile of data items; and
packing results of the convolution process into general-purpose destination registers,
wherein the auxiliary data includes a pixel block that is half a tile size of the tile of data items, and wherein the packing the at least one channel, the packing the at least one additional channel, and the storing the auxiliary data are performed in response to a single load instruction.

18. The method of claim 17, further comprising:
packing multiple channels of the tile of data items into each of the first general-purpose source register and the second general-purpose source register.

19. A method comprising:
when executing a non-convolution shader:
storing, by a shader in a single-instruction multiple data (SIMD) processor, scalar pixel data in general purpose registers (GPRs) associated with the SIMD; and
when executing a convolution shader:
storing, by the SIMD processor, pixel data as packed pixel data in GPRs associated with the SIMD, wherein the storing the pixel data as the packed pixel data in the GPRs includes:
packing at least one channel of the pixel data into a first source-GPR; and
packing at least one additional channel of the pixel data into a second source-GPR,
wherein the packing the at least one channel and the packing the at least one additional channel are performed in response to a single load instruction.

20. The method of claim 19, further comprising:
when executing the convolution shader:
storing, by the SIMD processor, vectors of different data types into a same size packed GPR.

21. The method of claim 19, further comprising:
loading auxiliary data into a third source-GPR.

22. The method of claim 21, further comprising:
performing the packing the at least one channel, the packing the at least one additional channel, and the loading in response to a single load instruction.

* * * * *